United States Patent
Menzel et al.

(10) Patent No.: US 10,873,840 B1
(45) Date of Patent: Dec. 22, 2020

(54) COMMUNICATION APPARATUS FOR VEHICLE-TO-X COMMUNICATION, METHOD AND USE

(71) Applicants: Continental Teves AG & Co. oHG, Frankfurt am Main (DE); Continental Automotive GmbH, Hannover (DE)

(72) Inventors: Marc Menzel, Weimar (DE); Ulrich Stählin, Rochester, MI (US)

(73) Assignees: Continental Teves AG & Co. oHG; Continental Automotive GmbH

( * ) Notice: Subject to any disclaimer, the term of this patent is extended or adjusted under 35 U.S.C. 154(b) by 0 days.

(21) Appl. No.: 16/525,886

(22) Filed: Jul. 30, 2019

(51) Int. Cl.
*H04W 4/40* (2018.01)
*H04W 4/44* (2018.01)

(52) U.S. Cl.
CPC ...................... *H04W 4/44* (2018.02)

(58) Field of Classification Search
CPC ..... H04L 67/12; H04L 67/2823; H04L 69/08; H04W 4/44; H04W 4/46; H04W 4/48; H04W 88/06
USPC ................ 455/41.1, 41.2, 67.11, 569.2, 297; 370/336; 704/251
See application file for complete search history.

(56) References Cited

U.S. PATENT DOCUMENTS

| | | | | |
|---|---|---|---|---|
| 2009/0083034 | A1* | 3/2009 | Hernandez | G10L 15/22 704/251 |
| 2014/0064199 | A1* | 3/2014 | Pan | H04L 1/1867 370/329 |
| 2015/0199902 | A1* | 7/2015 | Hayee | G08G 1/0955 340/907 |
| 2016/0286437 | A1* | 9/2016 | Enomoto | H04W 28/24 |
| 2017/0025015 | A1* | 1/2017 | Thompson | G08G 1/166 |
| 2017/0251541 | A1* | 8/2017 | Cavalcanti | G06Q 30/04 |
| 2017/0280436 | A1* | 9/2017 | Park | H04W 72/0446 |
| 2017/0288806 | A1* | 10/2017 | Blasco Serrano | H04W 72/048 |
| 2017/0330457 | A1* | 11/2017 | Bhalla | G08G 1/096741 |
| 2018/0068562 | A1* | 3/2018 | Ho | G08G 1/056 |
| 2018/0152819 | A1* | 5/2018 | Pinheiro | H04L 69/22 |

(Continued)

FOREIGN PATENT DOCUMENTS

| | | |
|---|---|---|
| WO | 2018031458 A1 | 2/2018 |
| WO | 2018074956 A1 | 4/2018 |
| WO | 2019109005 A1 | 6/2019 |

OTHER PUBLICATIONS

International Search Report and Written Opinion for International Application No. PCT/EP2020/070744, dated Sep. 11, 2020, 16 pages.

*Primary Examiner* — Tan H Trinh
(74) *Attorney, Agent, or Firm* — RatnerPrestia

(57) ABSTRACT

A communication apparatus for vehicle-to-X communication (V2X communication), including: a first V2X interface for transmitting and/or receiving vehicle-to-X messages by a first wireless communication technology, a second V2X interface for transmitting and/or receiving vehicle-to-X messages by a second wireless communication technology. Wherein the apparatus is configured to transmit information, which is received with a vehicle-to-X message by the first interface, by the second interface. The information received or respectively to be transmitted can be expediently had by at least one appropriate vehicle-to-X message received or respectively to be transmitted. A corresponding method as well as the use of the apparatus is also provided.

17 Claims, 2 Drawing Sheets

(56) References Cited

U.S. PATENT DOCUMENTS

| | | | |
|---|---|---|---|
| 2018/0159935 A1* | 6/2018 | Cavalcanti | H04W 4/40 |
| 2018/0197412 A1* | 7/2018 | Uchiyama | G08G 1/0112 |
| 2018/0234163 A1* | 8/2018 | Yasukawa | H04W 92/18 |
| 2018/0242115 A1* | 8/2018 | Kim | H04W 4/40 |
| 2018/0288589 A1* | 10/2018 | Punithan | H04W 28/02 |
| 2018/0365909 A1* | 12/2018 | Cheng | H04L 67/12 |
| 2018/0376307 A1* | 12/2018 | Itatsu | H04W 4/80 |
| 2019/0007974 A1* | 1/2019 | Nguyen | H04L 67/12 |
| 2019/0045521 A1* | 2/2019 | Hong | H04W 72/042 |
| 2019/0090173 A1* | 3/2019 | Xiao | H04W 4/40 |
| 2019/0096144 A1* | 3/2019 | Noh | H04W 12/1006 |
| 2019/0110191 A1* | 4/2019 | Lee | H04W 4/46 |
| 2019/0150147 A1* | 5/2019 | Lee | H04W 72/1278 370/336 |
| 2019/0159237 A1* | 5/2019 | Wei | H04W 4/40 |
| 2019/0176687 A1* | 6/2019 | Nagata | B60W 40/13 |
| 2019/0182700 A1* | 6/2019 | Kim | H04L 63/18 |
| 2019/0239186 A1* | 8/2019 | Tugnawat | H04W 68/02 |
| 2019/0245647 A1* | 8/2019 | Alieiev | G08G 1/0104 |
| 2019/0253852 A1* | 8/2019 | Bostrom | H04W 4/46 |
| 2019/0294966 A1* | 9/2019 | Khan | G06K 9/6267 |
| 2019/0320380 A1* | 10/2019 | Nylander | H04W 48/10 |
| 2019/0325751 A1* | 10/2019 | Altintas | G08G 1/166 |
| 2019/0331758 A1* | 10/2019 | Malkes | G01S 5/021 |
| 2019/0339082 A1* | 11/2019 | Doig | G08G 1/0141 |
| 2019/0349731 A1* | 11/2019 | Hehn | H04B 1/3827 |
| 2019/0373617 A1* | 12/2019 | Sun | H04W 24/02 |
| 2019/0387376 A1* | 12/2019 | Tang | H04W 48/16 |
| 2019/0394624 A1* | 12/2019 | Karampatsis | H04W 76/14 |
| 2020/0021960 A1* | 1/2020 | Hwang | H04W 4/44 |
| 2020/0037127 A1* | 1/2020 | Hwang | B60W 50/00 |
| 2020/0045552 A1* | 2/2020 | Kim | H04W 12/0608 |
| 2020/0053527 A1* | 2/2020 | Nylander | H04W 4/80 |
| 2020/0077238 A1* | 3/2020 | Alexander | H04W 84/005 |
| 2020/0079308 A1* | 3/2020 | Vanterpool | B60R 19/483 |
| 2020/0092685 A1* | 3/2020 | Fehrenbach | H04B 7/15507 |
| 2020/0105131 A1* | 4/2020 | Carter | H04W 76/14 |
| 2020/0120505 A1* | 4/2020 | Kim | H04W 4/06 |

* cited by examiner

COMMUNICATION APPARATUS FOR VEHICLE-TO-X COMMUNICATION, METHOD AND USE

FIELD OF THE INVENTION

The present invention relates to a communication apparatus for vehicle-to-X communication, a corresponding method and the use of the apparatus.

BACKGROUND OF THE INVENTION

At present, the relevant standards of vehicle-to-X (V2X) communication are, for example, IEEE802.11(p), IEEE16Q9, SAE 2735, SAE 2945 and ETSI ITS-G5. In addition, new standards are being compiled by 3GPP for Cellular-V2X (C-V2X) which, in addition to a mobile radio communication in a cellular mobile radio network (Uu), makes possible direct communication without the need for a cellular mobile radio network (PC5 or respectively "sidelink"). Technologies in order to be able to use ITS-G5 and C-V2X PC5 in the same band are currently being drawn up by ETSI. ITS-G5 or respectively DSRC is based on IEEE802.11, whilst C-V2X builds on LTE mobile radio technology. Consequently, these communication systems are fundamentally different, i.e. incompatible, and vehicles which are only equipped with one of the communication technologies cannot receive the messages of the other vehicles. The result of this is that the potential of vehicle-to-X communication technology cannot be fully harnessed. In particular, this has a negative effect on the potential increase in safety of road users, which can be achieved by vehicle-to-X communication.

SUMMARY OF THE INVENTION

An aspect of the invention is a communication apparatus which makes possible communication by means of inherently incompatible vehicle-to-X communication technologies, in particular ITS-G5 and C-V2X.

An aspect of the invention describes a communication apparatus for vehicle-to-X communication (V2X communication), comprising:
  a first V2X interface for transmitting and/or receiving vehicle-to-X messages by means of a first wireless communication technology,
  a second V2X interface for transmitting and/or receiving vehicle-to-X messages by means of a second wireless communication technology,
wherein the apparatus is configured to transmit information, which is received with a vehicle-to-X message by means of the first interface, by means of the second interface. The information received or respectively to be transmitted can be expediently comprised by at least one appropriate vehicle-to-X message received or respectively to be transmitted.

The concept which forms the basis of an aspect of the invention is to create, by means of a vehicle-to-X communication apparatus, which comprises a corresponding first V2X interface and a corresponding second V2X interface, an intelligent converter between the various V2X communication technologies, which converts the signals of a first V2X communication technology into the signals of a second V2X communication technology, in order to thus make possible as comprehensive as possible a communication of road users across both standards and manufacturers.

It should be understood that, in accordance with an aspect of the invention, the first communication technology and the second communication technology are viewed as different communication technologies if a direct exchange of data between a transmitter utilizing the first communication technology and a receiver utilizing the second communication technology is not possible. In other words, the first and the second communication technology are inherently incompatible vehicle-to-X communication technologies.

Consequently, an aspect of the invention advantageously makes possible communication by means of otherwise incompatible V2X communication technologies at the same time as a possible efficient utilization of the existing bandwidth. The different communication technologies or respectively standards developed for V2X communication can consequently be further used. This also means that, according to an embodiment of an aspect of the invention, if a communication apparatus is present in a relevant area with potential receivers which are otherwise only equipped with communication apparatuses for communicating by means of the second communication technology, a message transmitted by means of the first communication technology and received by the communication apparatus can, thanks to the conversion into the second communication technology, be received by all of the further potential receivers in the relevant area. In principle, the apparatus can be configured to carry out a filtering of the received messages or respectively information regarding the messages to be transmitted, or respectively such a filtering results from preferred embodiments of an aspect of the invention described below. Consequently, a more efficient usage of the available bandwidth of the communication technologies can be achieved, compared with an unfiltered transmission.

Furthermore, the communication apparatus comprises, in accordance with a further development, a computing device, e.g. a processor, for processing vehicle-to-X messages received and/or to be transmitted in particular by means of the first V2X interface and/or second V2X interface.

The communication apparatus is designed, according to a further development, with at least one first communication stack for realizing the V2X communication by means of the first wireless communication technology and a second communication stack for realizing the V2X communication by means of the second wireless communication technology.

In accordance with an embodiment of an aspect of the invention, one of the two communication technologies is ITS-G5 and the other communication technology is C-V2X. In this sense, C-V2X comprises the cellular mobile radio interface, e.g. so-called Uu, and/or a C-V2X technology which makes possible direct communication such as, for example, PC5 or respectively "sidelink". Accordingly, one of the two V2X interfaces is designed as an ITS-G5 interface and the other V2X interface is designed as a C-V2X interface. Depending on the application, the first communication technology is, accordingly, ITS-G5 and the second communication technology is C-V2X or the first communication technology is C-V2X and the second communication technology is ITS-G5. Consequently, a conversion of messages received by means of ITS-G5/C-V2X into the other communication technology respectively, that is to say C-V2X/ITS-G5, can be achieved. According to a further development, the C-V2X interface is an interface for direct communication by communication apparatuses, without a cellular mobile radio network. For example, this may be C-V2X PC5. The communication apparatus is, according to a further development, correspondingly designed to execute the respective communication stacks for IST-G5 and C-V2X, e.g. 4G or 5G or respectively subsequent versions (releases) of the mobile radio technology.

The apparatus is, in accordance with an embodiment, configured to convert the message type of the message comprising the received information into another message type for transmission by means of the second interface. In particular, it can also be envisaged that the conversion is executed as a function of the message type of the message comprising the received information. This makes it possible, as a function of the message type of the received message, to selectively carry out a conversion of this message type.

In accordance with an embodiment, the apparatus is configured to carry out a conversion into a collective perception message (CPM) for transmission by means of the second interface, as a function of the message type of the received message. A version of a collective perception message is currently being standardized at ETSI (TR 103 562 and TS 103 324) and is, in particular, based on results of the KoPER research project.

In accordance with an embodiment, the apparatus is configured to insert information comprised by a received cooperative awareness message (CAM), in particular according to ETSI TS 102 637-2, and/or a basic safety message (BSM), in particular according to SAE 32735, into a collective perception message. The underlying concept is to convert the CAM received by means of the first interface or respectively the information comprised by this into CPM objects and to transmit the latter by means of the second interface. Many recognized objects are summarized by the CPM in a message. In principle, CAM/BSM could, in general, also be converted into the second communication technology, according to an aspect of the invention, but a more advantageous bandwidth-efficient data compression is produced by inserting the received information from CAM/BSM into a CPM. Objects which have already been notified by other transmitters, and which have therefore already been received by means of the communication apparatus as well, are expediently not included in the CPM to be transmitted since it can be assumed that all of the other potential receivers in the surroundings have also received the CPM. During the selection of the objects to be transmitted, objects which have been determined to be irrelevant can also still be filtered out in order to further minimize the bandwidth consumption.

The apparatus is configured, in accordance with an embodiment, to carry out the transmission of received information as a function of the message type of the received message comprising the information. Accordingly, it can be envisaged that only specific message types of received messages are enlisted for a transmission. In particular, comparatively unimportant message types could be consequently suppressed during further distribution via the second communication technology. According to a further development, the apparatus can be configured to only carry out the transmission of received information if the message comprising said information constitutes an event-based message type. The apparatus can accordingly, for example, be configured to only carry out the transmission if the received message is a decentralized environmental notification message (DENM) and/or a basic safety message (BSM) having an event flag.

The apparatus is, in accordance with an embodiment, configured to not carry out the transmission of information, which is received by means of the first interface, via the second interface until after a predefined or random period of time following receipt of the information. A random period of time can, for example, be generated by enlisting a random number generator.

In accordance with an embodiment, the apparatus is configured to not carry out the transmission of information, which is received by means of the first interface, via the second interface if consistent information has also been received by means of the second interface. The transmission of information, which has been received via the first interface, via the second interface is superfluous if the original transmitter of the information and/or another transmitter, which has, if applicable, already carried out a conversion into the second communication technology, has already realized a transmission of the information by means of the second communication technology.

The apparatus is configured, in accordance with an embodiment, to carry out a check by means of a checking device comprised by this, for example by the computing device of the apparatus, to establish whether the received information can be confirmed by means of at least one further information source or respectively can be confirmed. For example, at least one sensor for detecting the environment can be enlisted as a further information source. The check is expediently effected prior to retransmitting the information. As a result, it is in particular possible to increase the confidence in the information. According to a further development, it can accordingly be provided that the apparatus is designed to add confidence information to a message comprising the information for transmission, which confidence information indicates whether the information has been confirmed by means of at least one further information source and/or reproduces a confidence measure of the information.

In accordance with an embodiment, the apparatus is configured to carry out a check to establish whether the accuracy of the received information can be improved. The check and, if applicable, improvement of the accuracy of the received information are expediently effected prior to the transmission. In the event that the accuracy of the information can be improved, the apparatus is configured, in accordance with an embodiment, to alter the information in order to improve the accuracy. The apparatus can furthermore be configured to enlist information obtained by means of sensors in order to improve the accuracy of the information.

In accordance with at least one embodiment of an aspect of the invention, the communication apparatus is in particular provided for use in a vehicle, a road side unit or a device which can be carried with them by a person or respectively a personal mobile device, by way of example a smartphone. The vehicle can be, for example, a motor vehicle, in particular a car, a truck, a motor cycle, an electric vehicle or a hybrid vehicle, a water craft or an aircraft. In principle, the computing device of the communication apparatus or a further computing device of the communication apparatus can consequently also be configured, beyond the extent previously described, to process information received and/or to be transmitted.

An aspect of the invention further relates to a method for vehicle-to-X communication (V2X communication), comprising the steps of:

receiving information by means of a first V2X interface for transmitting and/or receiving vehicle-to-X messages by means of a first wireless communication technology, transmitting the received information by means of a second V2X interface for transmitting and/or receiving vehicle-to-X messages by means of a second wireless communication technology.

In principle, transmitting received information can also refer to a retransmission thereof.

Further embodiments of the method according to an aspect of the invention are set out by the described embodiments of the communication apparatus according to an aspect of the invention.

In a further development of the indicated communication apparatus, the apparatus has a memory and a processor. The indicated method is saved in the memory in the form of a computer program, and the processor is provided in order to execute the method when the computer program is loaded from the memory into the processor.

According to a further aspect of the invention, a computer program comprises program code means, in order to perform all of the steps of one of the indicated methods when the computer program is run on a computer or one of the indicated apparatuses.

According to a further aspect of the invention, a computer program product contains a program code which is stored on a computer-readable data carrier and which, when it is run on a data processing device, performs one of the indicated methods.

BRIEF DESCRIPTION OF THE DRAWINGS

Some particularly advantageous configurations of aspects of the invention are indicated in the subordinate claims. Further preferred embodiments are also set out by the following description of embodiment examples with reference to only schematically represented figures, wherein:

DETAILED DESCRIPTION OF THE PREFERRED EMBODIMENTS

Figure 1:
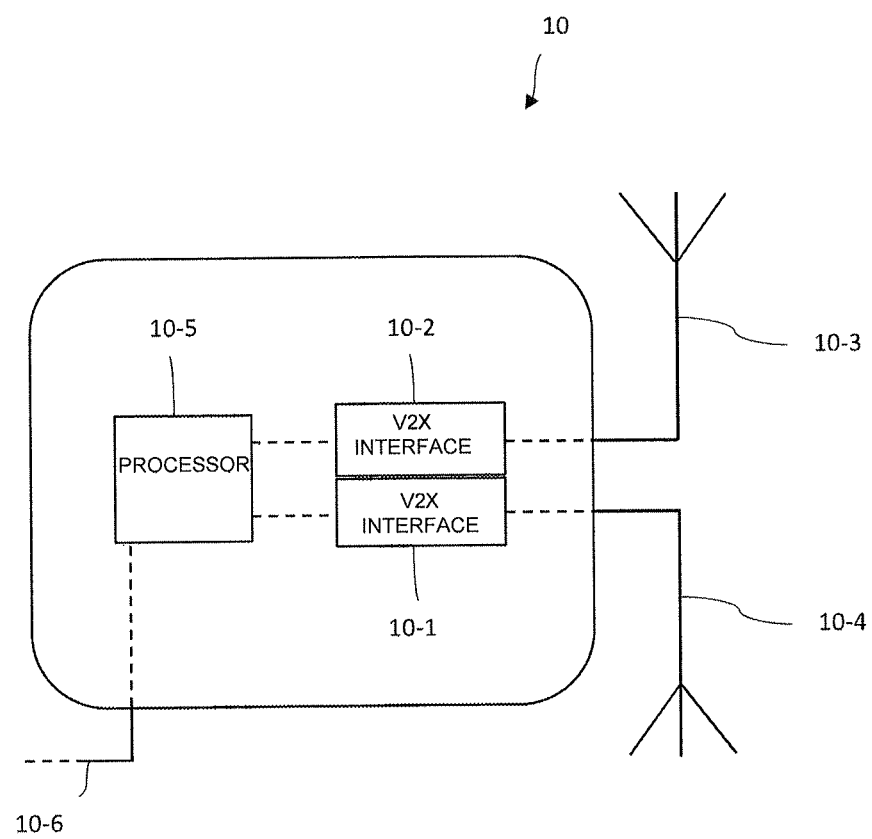
FIG. 1 shows an exemplary embodiment of the communication apparatus according to an aspect of the invention.

FIG. 1 shows an exemplary example of the communication apparatus 10 for vehicle-to-X communication (V2X communication) according to an aspect of the invention, comprising a first V2X interface 10-1 for transmitting and/or receiving vehicle-to-X messages by means of a first wireless communication technology using a first antenna 10-4, and a second V2X interface 10-2 for transmitting and/or receiving vehicle-to-X messages by means of a second wireless communication technology using a second antenna 10-3. Furthermore, the communication apparatus 10 comprises, according to the exemplary example, a computing device 10-5, e.g. a processor, for processing, in particular, vehicle-to-X messages received and/or to be transmitted by means of the first V2X interface and/or second V2X interface. The apparatus is configured to transmit information, which is received with a vehicle-to-X message by means of the first interface 10-1, by means of the second interface 10-2, wherein the information to be transmitted is expediently comprised by at least one appropriate vehicle-to-X message to be transmitted. The first communication technology and the second communication technology do not make possible a direct exchange of data between a transmitter utilizing the first communication technology and a receiver utilizing the second communication technology. In other words, the first and the second communication technology are inherently incompatible vehicle-to-X communication technologies. Consequently, signals of a first V2X communication technology can be converted by the communication apparatus 10 into the signals of a second V2X communication technology, as a result of which as comprehensive as possible a communication of road users across both standards and manufacturers can be made possible. A processing of vehicle-to-X messages received and/or to be transmitted or respectively information can be carried out by means of the computing device 10-5 of the communication apparatus, wherein a communication with further electronic systems, for example a vehicle comprising the communication apparatus, can be realized by means of a data transmission device 10-6, e.g. a data bus.

Figure 2:
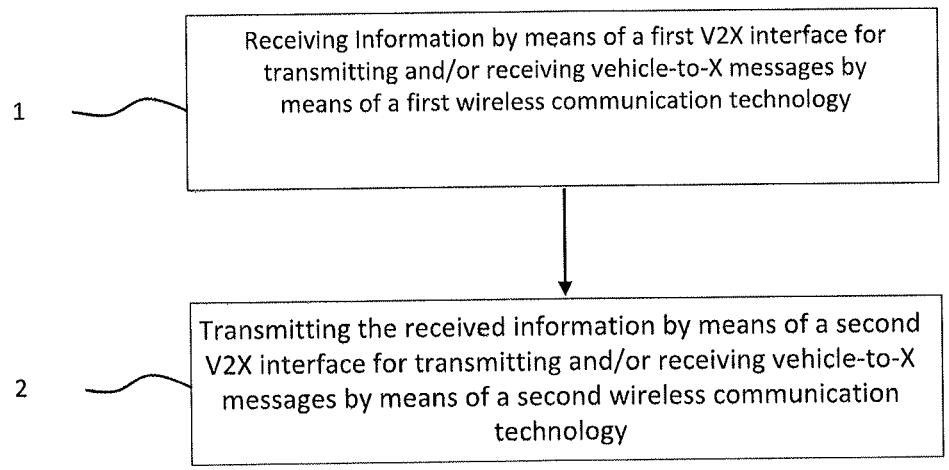
FIG. 2 shows a flow chart of an exemplary embodiment of the method according to an aspect of the invention.

FIG. 2 shows a flow chart of an exemplary example of the method for vehicle-to-X communication according to an aspect of the invention, wherein information is received by means of a first V2X interface for transmitting and/or receiving vehicle-to-X messages by means of a first wireless communication technology in a step 1, and the received information is transmitted by means of a second V2X interface for transmitting and/or receiving vehicle-to-X messages by means of a second wireless communication technology in a step 2.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the attainment of independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication or respectively communication via the intermediary of mobile radio between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication. For example, vehicle-to-X communication can take place using the standards IEEE 802.11p or IEEE 1609.4 or 4G or 5G or subsequent mobile radio generations. Vehicle-to-X communication can also be referred to as C2X communication or V2X communication. The sub-areas can be referred to as C2C (Car-to-Car), V2V (Vehicle-to-Vehicle) or C2I (Car-to-Infrastructure) or V2I (Vehicle-to-Infrastructure). An aspect of the invention includes vehicle-to-X communication with the intermediary of, for example, a mobile network, therefore the so-called V2N (Vehicle-to-Network).

The invention claimed is:

1. A communication apparatus for vehicle-to-X communication (V2X communication), comprising:
    a first V2X interface for transmitting and/or receiving vehicle-to-X messages by a first wireless communication technology; and
    a second V2X interface for transmitting and/or receiving vehicle-to-X messages by a second wireless communication technology,
    wherein the apparatus is configured to:
        transmit information, which is received with a vehicle-to-X message by the first interface, by the second interface, and
        carry out a check by a checking device to establish whether the received information can be confirmed by at least one further information source and, in the event that said information can be confirmed, to add confidence information to a message comprising the information for transmission, which confidence information indicates whether the information has been confirmed by at least one further information source and/or reproduces a confidence measure of the information.

2. The communication apparatus according to claim 1, wherein one of the two V2X interfaces is designed as at least one of a dedicated short range communication (DSRC) interface or an ITS-G5 interface or an IEEE802.11(p) interface, and the other V2X interface is designed as a C-V2X interface.

3. The communication apparatus according to claim 1, configured to convert a message type of a message comprising the received information into another message type for transmission by the second interface.

4. The communication apparatus according to claim 3, configured to execute the conversion as a function of the message type of the message comprising the received information.

5. The communication apparatus according to claim 1, configured to carry out a conversion into a collective perception message for transmission by the second interface, as a function of the message type of the received message.

6. The communication apparatus according to claim 5, configured to insert information comprised by a received cooperative awareness message and/or a basic safety message into a collective perception message for transmission by means of the second interface.

7. The communication apparatus according to claim 1, configured to carry out the transmission of received information as a function of the message type of the received message comprising the information.

8. The communication apparatus according to claim 1, configured to only carry out the transmission of received information if the message comprising said information constitutes an event-based message type.

9. The communication apparatus according to claim 1, configured to only carry out the transmission if the received message is a decentralized environmental notification message and/or a basic safety message having an event flag.

10. The communication apparatus according to claim 1, configured to not carry out the transmission of information, which is received by the first interface, via the second interface until after a predefined or random period of time.

11. The communication apparatus according to claim 1, configured to not carry out the transmission of information, which is received by means of the first interface, via the second interface if consistent information has also been received by the second interface.

12. The communication apparatus according to claim 1, configured to carry out a check to establish whether accuracy of the received information can be improved and, in the event that the accuracy of the received information can be improved, to improve the accuracy of the received information.

13. The communication apparatus according to claim 12, configured to enlist information obtained by sensors in order to improve the accuracy of the information.

14. Use of the communication apparatus according to claim 1 in a vehicle, a road side unit or a personal mobile device.

15. A method for vehicle-to-X communication (V2X communication), comprising:
    receiving, via a first interface of a communication apparatus, information in a first vehicle-to-X message, the information configured according to a format of a first wireless communication technology;
    transmitting, via a second interface of the communication apparatus, the received information, the transmitted information configured according to a format of a second wireless communication technology; and
    carry out a check by a checking device to establish whether the received information can be confirmed by at least one further information source and, in the event that said information can be confirmed, to add confidence information to a message comprising the information for transmission, which confidence information indicates whether the information has been confirmed by at least one further information source and/or reproduces a confidence measure of the information.

16. A communication apparatus for vehicle-to-X communication (V2X communication), comprising:
    a first V2X interface for transmitting and/or receiving vehicle-to-X messages by a first wireless communication technology; and
    a second V2X interface for transmitting and/or receiving vehicle-to-X messages by a second wireless communication technology,
    wherein the apparatus is configured to:
        receive information in a first vehicle-to-X message via the first interface, the information configured according to a cooperative awareness message (CAM) or a basic safety message (BSM) format of the first wireless communication technology,
        convert, as a function of the message type of the received message, the CAM or the BSM to a collective perception message (CPM) format of the second wireless communication technology, the conversion including:
            identifying objects within the CAM or the BSM have been received by the communication apparatus from other transmitters, and identifying objects within the CAM or the BSM have not been received by the communication apparatus from other transmitters,
            inserting into the CPM, the objects within the CAM or the BSM that have not been received by the communication apparatus from other transmitters,
            excluding from the CPM, the objects within the CAM or the BSM that have been received by the communication apparatus from other transmitters, and
        transmit the CPM in a second vehicle-to-X message via the second interface.

17. The communication apparatus according to claim 16, wherein the apparatus is further configured to:
   carry out a check to establish whether accuracy of the received information can be improved by sensor information, and
   in the event that the accuracy of the received information can be improved, modify the received information based on the sensor information to improve the accuracy.

* * * * *